United States Patent [19]

Gleasman et al.

[11] Patent Number: 4,776,235
[45] Date of Patent: Oct. 11, 1988

[54] NO-SLIP, IMPOSED DIFFERENTIAL REDUCTION DRIVE

[76] Inventors: Vernon E. Gleasman, 11 Pondview Dr., Pittsford, N.Y. 14534; Keith E. Gleasman, 11 McCord Woods Dr., Fairport, N.Y. 14450; James Y. Gleasman, 1701 Laguna Loma Cove, Austin, Tex. 78746

[21] Appl. No.: 27,748

[22] Filed: Mar. 19, 1987

Related U.S. Application Data

[63] Continuation-in-part of Ser. No. 728,575, Apr. 29, 1985, abandoned, which is a continuation-in-part of Ser. No. 544,390, Oct. 21, 1983, abandoned.

[51] Int. Cl.$^4$ .............................................. F16H 37/06
[52] U.S. Cl. .................................... 74/720.5; 74/705; 74/675; 180/6.44
[58] Field of Search ....................... 74/720.5, 705, 675; 180/6.44

[56] References Cited

U.S. PATENT DOCUMENTS

| | | | |
|---|---|---|---|
| 1,542,069 | 6/1925 | McKay et al. | 74/720.5 |
| 1,991,094 | 2/1935 | Higley | 74/720.5 X |
| 1,999,071 | 4/1935 | Alden | 74/710 |
| 2,253,757 | 8/1941 | Bugatti | 74/675 X |
| 2,332,838 | 10/1943 | Borgward | 180/6.44 X |
| 2,336,912 | 12/1943 | Zimmermann | 180/6.44 X |
| 2,542,157 | 2/1951 | Odom | 74/710 X |
| 2,730,182 | 1/1956 | Sloane | 180/6.44 |
| 2,763,164 | 9/1956 | Neklutin | 180/6.44 X |
| 2,780,299 | 2/1957 | Matson | 180/6.44 X |
| 2,859,641 | 11/1958 | Gleasman | 74/715 |
| 3,027,780 | 4/1962 | Storer et al. | 74/710 |
| 3,371,734 | 3/1968 | Zaunberger et al. | 74/720.5 X |
| 3,450,218 | 6/1969 | Looker | 74/720.5 X |
| 4,016,754 | 4/1977 | Wiss | 73/862 X |
| 4,274,281 | 6/1981 | Hoodwin | 73/118 |
| 4,489,597 | 12/1984 | Davison | 73/118 |
| 4,497,218 | 2/1985 | Zaunberger | 74/720.5 X |

FOREIGN PATENT DOCUMENTS

| | | | |
|---|---|---|---|
| 1162937 | 9/1958 | France | |
| 323334 | 12/1934 | Italy | 180/6.44 |
| 707655 | 4/1954 | United Kingdom | 180/6.44 |

*Primary Examiner*—Dirk Wright
*Attorney, Agent, or Firm*—Stonebraker, Shepard & Stephens

[57] ABSTRACT

A no-slip, imposed differential uses a first unlimited slip differential 15 connected for driving a pair of axle shafts 16 and 17 and a second unlimited slip differential 20 connected between a pair of control shafts 22 and 23. One of the axle shafts and one of the control shafts are connected for rotation in the same direction, and the other axle shaft and the other control shaft are connected for rotation in opposite directions. An input control gear 40 meshed with a ring gear 21 for second differential 20 can rotate control shafts 22 and 23 to impose differential rotation on axle shafts 16 and 17 via the shaft connecting means. This provides a no-slip drive when control gear 40 is not turning and a steering drive by imposed differential rotation when control gear 40 turns. The same no-slip, differential rotation effect can be achieved in a reduction drive system by using differential reduction gears on each side of the vehicle and inputting the driving and steering control torques into the reduction gears, which differentially combine the torques and apply the result to right and left drive elements. A clutched power take-off 92 can direct propulsion torque to the steering control input for rapid pivot turns.

9 Claims, 7 Drawing Sheets

NO-SLIP, IMPOSED DIFFERENTIAL REDUCTION DRIVE

RELATED APPLICATIONS

This application is a continuation-in-part of pending parent application Ser. No. 728,575, filed Apr. 29, 1985, entitled NO-SLIP, IMPOSED DIFFERENTIAL, which parent application is a continuation-in-part of grandparent application Ser. No. 544,390, filed Oct. 21, 1983, entitled NO-SLIP, IMPOSED DIFFERENTIAL, parent application Ser. No. 728,575 being abandoned upon the filing of this application.

BACKGROUND

This invention arose from a search for a better way of steering track-laying vehicles, although the resulting discoveries also apply to many types of wheeled vehicles. Track-laying vehicles such as tractors are steered by a clutch and brake system that can unclutch the power to one track and brake one track while another track drives. Such arrangements are expensive and troublesome for many reasons, however.

For example, disconnecting power to the left track of a tractor running on level ground tends to make the tractor turn left because the driving right track outdistances the left, but doing the same thing when the tractor is running downhill tends to make it turn right because the engine holds the right track back while the left rolls free. Braking tracks to slow down tends to straighten the line of travel so drivers must guard against braking on curves. Also, the sharpest turn a track-laying vehicle can make is by braking one track while driving the other, and this stresses the braked track considerably.

In searching for a better solution for these and other problems, we have discovered a way of imposing differential rotation on axle shafts for steering both track-laying and wheeled vehicles. Our imposed differential can simultaneously drive wheels or tracks forward on one side of a vehicle and backward on the other side to allow pivot turns around a central point without overly stressing tracks or wheels. Our system can apply main propulsion drive torque to such pivot turns to accomplish them rapidly, if necessary. Our discovery also provides a no-slip differential that drives both sides of a vehicle regardless of relative traction and applies more power to the side with the greater traction. Our invention accomplishes these advances by combining inexpensive and well-known components in ways that produce improved results.

SUMMARY OF THE INVENTION

Our no-slip, imposed differential uses a first unlimited slip differential connected for driving a pair of axle shafts and a second unlimited slip differential connected between a pair of control shafts. One of the control shafts is connected to one of the axle shafts for rotation in the same direction, and the other control shaft is connected to the other axle shaft for rotation in opposite directions. An input control gear meshed with a ring gear for the second differential can turn to rotate the control shafts and impose differential rotation on the axle shafts via the shaft connecting means. One wheel or track cannot slip in response to light traction because the axle shafts are geared together through the second differential. The control gear is preferably a worm gear, and the ring gear for the second differential is preferably a worm wheel. Turning the control gear steers the vehicle because of the differential rotation this imposes on the vehicle's axle shafts driving wheels or tracks on opposite sides of the vehicle.

For vehicles using reduction drives, the two differentials can be replaced by the differential capability of a pair of right and left differential reduction gears. Both driving and steering control torque can be supplied to the differential reduction gears on opposite sides of the vehicle where the torques combine in a reduced drive for wheels or tracks. For reduction drive systems, we also prefer that steering control be input so as to turn, but not be turned by, the differential reduction gears. For making pivot turns more rapidly, we prefer a clutched power take-off system for diverting driving torque to the steering control input, since driving torque is not needed for propelling the vehicle forward or backward during pivot turns.

DETAILED DESCRIPTION

Figure 1:
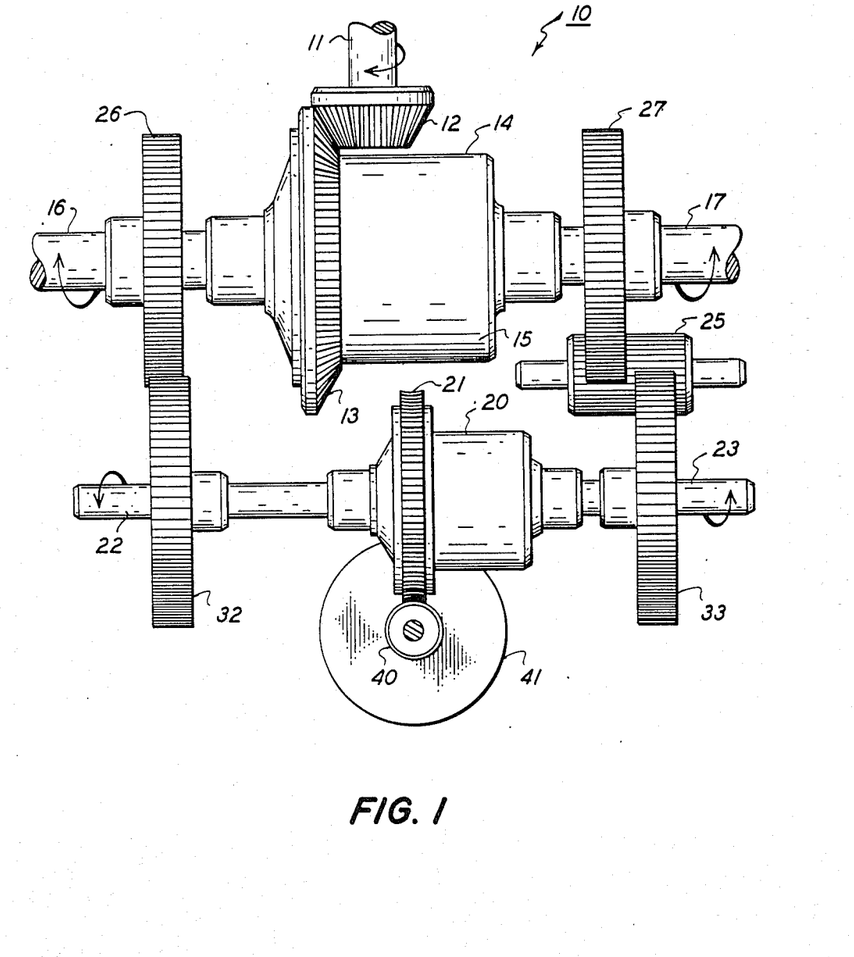
FIG. 1 is a partially schematic view of a preferred embodiment of a no-slip, imposed differential according to our invention.
Figure 2:
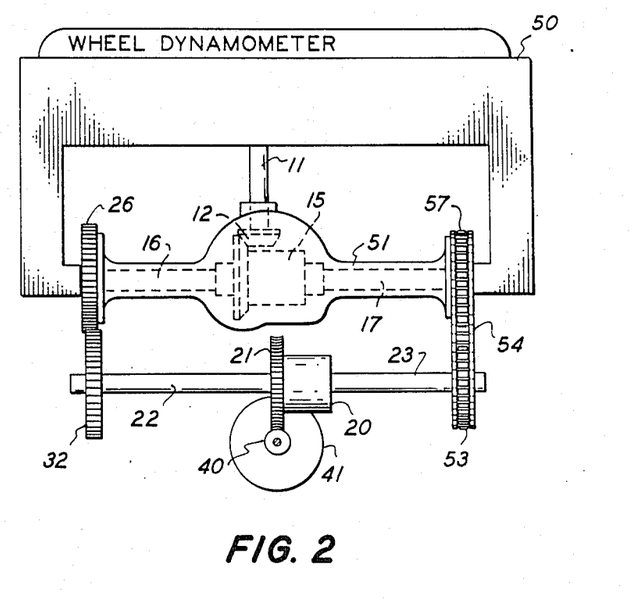
FIG. 2 is a partially schematic view of our imposed differential applied to a wheel dynamometer.

An explanation of the operation and advantages of our invention follows a description of the basic preferred structure or configuration of our no-slip, imposed differential as best shown in FIGS. 1 and 2.

STRUCTURE

As applied to a vehicle as shown in FIG. 1, engine power input via shaft 11 turning gear 12 rotates ring gear 13 and case 14 of a conventional, unlimited slip differential 15 connected for driving a pair of axle shafts 16 and 17 on opposite sides of the vehicle. Differential 15 is generally known and well understood in the power transmission art and is suitably sized to the vehicle being driven. This can range from small garden tractors and tillers up to large tractors and earth movers. Differential 15 is preferably a bevel gear differential lacking any limited slip devices so as not to impair differential rotation of axle shafts 16 and 17.

A second differential 20, also of a conventional unlimited slip design, is connected between a pair of control shafts 22 and 23 that are interconnected in a driving relationship with axle shafts 16 and 17. One control shaft 23 and one axle shaft 17 are connected for rotation in the same direction, and another control shaft 22 and another axle shaft 16 are connected for rotation in opposite directions. This causes counter or differential rotation of control shafts 22 and 23 as axle shafts 16 and 17 rotate in the same direction and conversely causes differential rotation of axle shafts 16 and 17 as control shafts 22 and 23 rotate in the same direction.

Gear connections between control shafts and axle shafts as shown in FIG. 1 are preferred for larger and more powerful vehicles. These include axle shaft gears 26 and 27 fixed respectively to axle shafts 16 and 17 and control shaft gears 32 and 33 fixed respectively to control shafts 22 and 23. Meshing axle shaft gear 26 with control shaft gear 32 provides opposite rotation between axle shaft 16 and control shaft 22, and meshing both axle shaft gear 27 and control shaft gear 33 with idler gear 25 provides same direction rotation for axle shaft 17 and control shaft 23.

Gear connections between control shafts and axle shafts are preferably incorporated into an enlarged housing containing both axle differential 15 and control differential 20. For a reason explained below, control differential 20 can be sized to bear half the force borne by axle differential 15 so that the complete assembly can be fitted within a differential housing that is not unduly large.

Smaller or less powerful vehicles can use shaft interconnections such as belts or chains in place of gearing. Also, shaft interconnections need not be limited to the region of the axle differential and can be made toward the outer ends of the axle shafts.

A gear or drive ratio between control shafts and axle shafts is preferably 1:1. This ratio can vary, however, so long as it is the same on opposite sides of the axle and control differentials.

An input control gear 40 meshes with a ring gear 21 of control differential 20 for imposing differential rotation on the system. Gear 40 is preferably a worm gear, and ring gear 21 is preferably a worm wheel so that ring gear 21 turns only when gear 40 turns.

Gear 40 can be turned by several mechanisms, depending on the objective. For steering purposes, gear 40 can be turned by a steering shaft joined to control gear 40 and manually turned by a driver. Steering mechanisms can also use motors for turning gear 40. Alternatives include a DC starter motor 41 electrically turned via a rheostat in a steering system and a hydraulic or pneumatic motor 41 turned by a vehicle's hydraulic or pneumatic system in response to a steering control.

Our invention can also be applied to a wheel dynamometer 50 as schematically shown in FIG. 2. For such purpose, the drive axle 51 being tested by the dynamometer provides axle shafts 16 and 17 and axle differential 15, which need not be an unlimited slip differential and can be a no-slip differential such as disclosed in U.S. Pat. No. 2,859,641. Power applied via input shaft 11 turns axle shafts 16 and 17, which can be subjected to varying loads by wheel dynamometer 50.

Previous wheel dynamometers have caused differential rotation of axle shafts 16 and 17 by subjecting them to different loads. This will not work with the differential of U.S. Pat. No. 2,859,641, which applies more power to the more heavily loaded axle shaft.

Our invention can apply differential rotation directly and realistically to axle shafts 16 and 17 via control differential 20 and its control shafts 22 and 23. These are connected to axle shafts 16 and 17 for same and opposite direction rotation as explained above; and when turned by control gear 40 rotated by motor 41, control shafts 22 and 23 impose differential rotation on axle shafts 16 and 17.

Several drive interconnections are possible between the control shafts and the axle shafts of the test axle mounted on wheel dynamometer 50. One preferred arrangement shown in FIG. 2 uses meshed gears 26 and 32 fixed respectively to test axle shaft 16 and control shaft 22 for opposite direction rotation. Sprockets 57 and 53, coupled by a chain 54 and fixed respectively to test axle shaft 17 and control shaft 23, provide same direction rotation. Belts and other gearing arrangements are also possible.

NO-SLIP, IMPOSED DIFFERENTIAL OPERATION

Two important effects occur from the interconnection of control differential 20 and its control shafts 22 and 23 with axle differential 15 and axle shafts 16 and 17. One is a no-slip drive that prevents wheels or tracks from slipping unless slippage occurs on both sides of the vehicle at once. The other effect is imposed differential rotation that can accomplish steering to pivot or turn a vehicle.

The no-slip drive occurs because axle shafts 16 and 17 are geared together via differential 20. Power applied to an axle shaft on a side of the vehicle that has lost traction is transmitted to the connecting control shaft on that side, through differential 20 to the opposite control shaft, and back to the opposite axle shaft where it is added to the side having traction. So if one axle shaft loses traction, the opposite axle shaft drives harder; and the only way slippage can occur is if both axle shafts lose traction simultaneously.

To elaborate on this, consider a vehicle rolling straight ahead with its axle shafts 16 and 17 turning uniformly in the same direction. Control gear 40 is stationary for straight ahead motion; and since control gear 40 is preferably a worm gear, worm wheel 21 of control differential 20 cannot turn. Control shafts 22 and 23, by their driving connections with the axle shafts, rotate differentially in opposite directions, which control differential 20 accommodates.

Axle differential 15 equally divides the power input from shaft 11 and applies one-half of the input power to each axle shaft 16 and 17. If the track or wheel being driven by axle shaft 16 loses traction, it cannot apply the power available on shaft 16 and tends to slip. Actual slippage cannot occur, however, because axle shaft 16 is geared to control shaft 22. So if a wheel or track without traction cannot apply the power on shaft 16, this is transmitted to control shaft 22, which rotates in an opposite direction from axle shaft 16. Since ring gear 21 cannot turn, rotational power on control shaft 22 is transmitted through differential 20 to produce opposite rotation of control shaft 23. This is geared to axle shaft 17 via idler gear 25 so that power on control shaft 23 is applied to axle shaft 17 to urge shaft 17 in a forward direction driving the wheel or track that has traction and can accept the available power. Since only one-half of the full available power can be transmitted from one axle shaft to another via differential 20 and its control shafts, these can be sized to bear one-half the force borne by axle differential 15 and its axle shafts.

Of course, unusable power available on axle shaft 17 because of a loss of traction on that side of the vehicle is transmitted through the same control shaft and control differential route to opposite axle shaft 16. This arrangement applies the most power to the wheel or track having the best traction, which is ideal for advancing the vehicle. The wheel or track that has lost traction will maintain rolling engagement with the ground while the other wheel or track drives. The only time wheels or tracks can slip is when they both lose traction simultaneously.

To impose differential rotation on axle shafts 16 and 17 for pivoting or turning the vehicle, it is only necessary to rotate control gear 40. This differentially rotates axle shafts to turn or pivot the vehicle because of the different distances traveled by the differentially rotating wheels or tracks on opposite sides of the vehicle. Steering controlled by rotating gear 40 can be applied to track-laying vehicles and wheeled vehicles that steer without using turning wheels. It can also be used for differentially rotating drive wheels or tracks to provide power-assisted steering for a vehicle that also has turning wheels.

Whenever control gear 40 turns, it rotates ring gear 21, which turns the casing of differential 20 to rotate control shafts 22 and 23 in the same direction. The connection of control shafts 22 and 23 with axle shafts 16 and 17 converts the same direction rotation of control shafts 22 and 23 to opposite differential rotation of axle shafts 16 and 17, as accommodated by axle differential 15. This drives wheels or tracks forward on one side of the vehicle and rearward on the other side of the vehicle, depending on the direction of rotation of control gear 40.

Such differential rotation is added to whatever forward or rearward rotation of the axle shafts is occurring at the time. So if a vehicle is moving forward or backward when control gear 40 turns, the differential rotation advances and retards opposite axle shafts and makes the vehicle turn.

Figure 3:
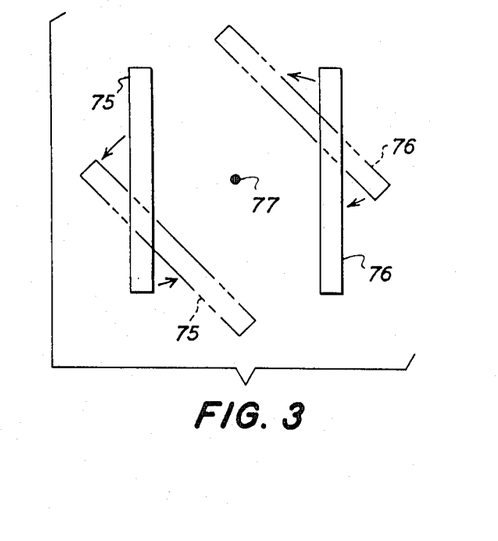
FIG. 3 is a schematic view of a vehicle pivot turn made possible by our imposed differential.

If a vehicle is not otherwise moving when control gear 40 turns, wheels or tracks go forward on one side and backward on the other side so that the vehicle pivots on a central point. This is schematically illustrated in FIG. 3 for a vehicle having a pair of tracks 75 and 76. Both tracks can have a rolling engagement with the ground as the vehicle rotates around a center point 77 by driving right track 76 forward and left track 7 rearward. The tracks experience some heel and toe scuffing, but this is less stress than if one track were braked still and the other driven. The pivot turn also spins the vehicle on one point 77, without requiring motion in any direction as must occur when one track is braked and another is driven.

Pivot turns can also be made with wheeled vehicles, such as tractors, loaders, forklifts, etc. Many of these now have turning wheels that could advantageously be replaced by non-turning wheels steered by imposed differential rotation according to our invention. To accommodate such vehicles, our invention can be applied to more than one drive axle powering more than one pair of drive wheels. Evidence indicates that pivot-turning capability can save considerable time for loaders, tractors, and forklifts compared to turning patterns requiring forward and rearward motion.

REDUCTION DRIVE SYSTEMS

Our no-slip steer drive can also be applied to vehicles with reduction gear drives where it can take advantage of differential capability of a reduction gear system to eliminate conventional differentials. One preferred way of doing this is shown schematically in FIG. 4.

Figure 4:
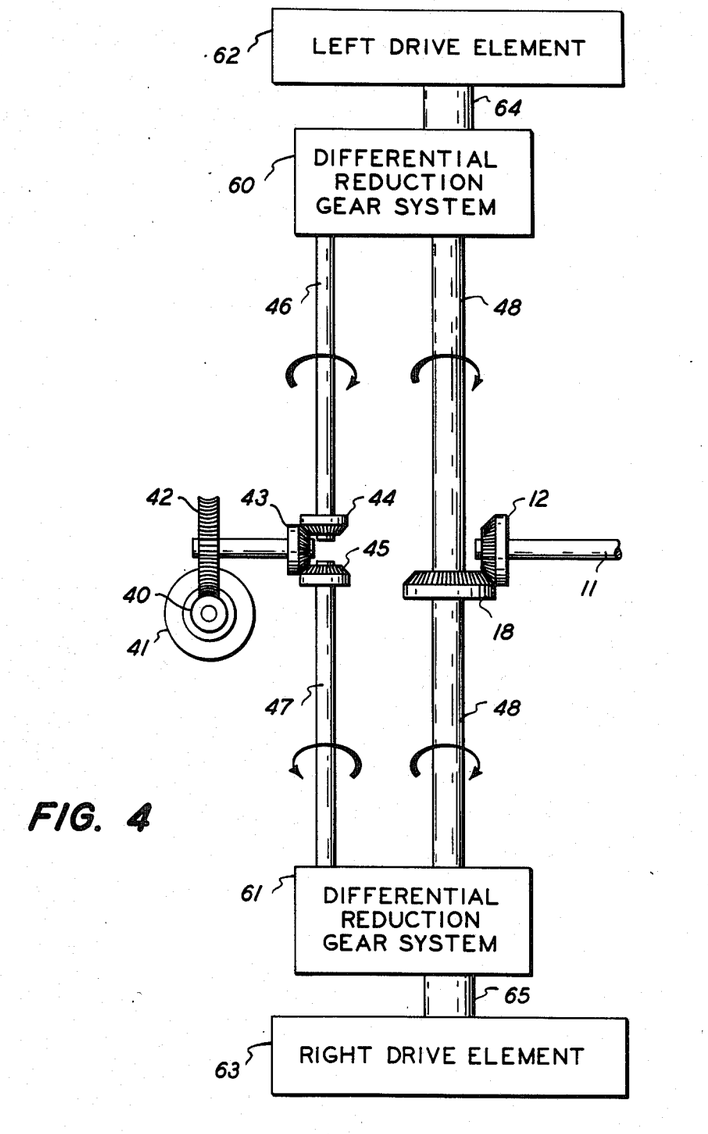
FIG. 4 is a schematic view of our no-slip, imposed differential applied to a reduction gear drive system.

By using a pair of reduction gear systems 60 and 61 that also have differential capacity, as explained more fully below, both driving and steering control torque can be input directly into differential reduction gears 60 and 61. These differentially combine the driving and steering torques to rotate reduction drive members 64 and 65 respectively turning drive elements 62 and 63, which can be wheels or track sprockets that advance and steer a vehicle in the way described above.

Driving torque can input same direction rotation into differential reduction gears 60 and 61 directly from drive shaft 11, gear 12, and gear 18 turning shaft 48 as shown by the arrows from moving the vehicle either forward or reverse. Steering control torque, derived from steering control motor 41 turning worm 40 and worm wheel 42, can be input via gears 43-45 to produce counterrotation of steering control shafts 46 and 47 oppositely turning elements of differential reduction gear systems 60 and 61 to produce differential rotation for steering purposes. Gear systems 60 and 61 differentially combine and reduce the driving an steering control torques and apply the result to drive elements 62 and 63. There are also many other ways that same direction driving torque and opposite direction steering control torque can be input to differential reduction gears 60 and 61. Among them is a solid shaft inputting steering torque to one differential reduction gear directly and to another differential reduction gear via a torque reversing idler gear.

By using worm 40 and worm wheel 42, shafts 46 and 47 can be rotated by steering control input to turn, but not be turned by, elements of reduction gear systems 60 and 61. Another way to accomplish the same effect is to make steering motor 41 a hydraulic motor driving gear 43, which then cannot turn motor 41. Either way, it is important to hold steering control shafting against rotation except when differential rotation is required for turning and is supplied by a steering control input.

Differential reduction gear systems 60 and 61 can have many different forms as shown in FIGS. 5-8. Both planetary and non-planetary differential reduction gears are possible, and inputs and outputs for these can be arranged in various ways.

Figure 5:
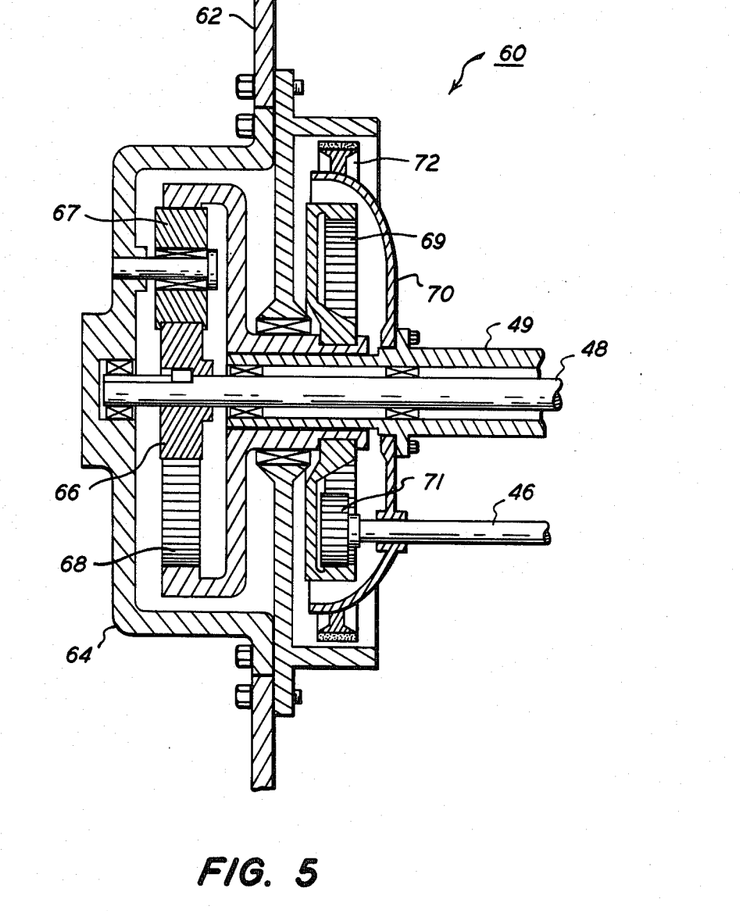
FIG. 5 is a partially schematic cross-sectional view of a planetary reduction gear system for applying our invention to a sprung vehicle.

FIG. 5 schematically shows one preferred way of applying our invention to a planetary reduction drive suitable for a sprung vehicle. Drive shaft 48 extends through axle housing 49 and drives sun gear 66. Steering shaft 46 extends through a brake assembly 70 secured to housing 49 and turns a gear 71 meshed with a gear 69 keyed to planetary ring gear 68. This applies steering control torque to planetary ring gear 68 surrounding driving torque sun gear 66. In between these is an array of preferably three planet gears 67 (one of which is shown) that turn a housing hub 64 at a reduced speed applied to drive element 62 in the form of a wheel (only the inner portion of which is shown). A brake 72 in brake assembly 70 can brake wheel 62, and the planetary reduction gear system is arranged well outboard into the wheel to allow a wide stance for springs supporting the vehicle.

Figure 6:
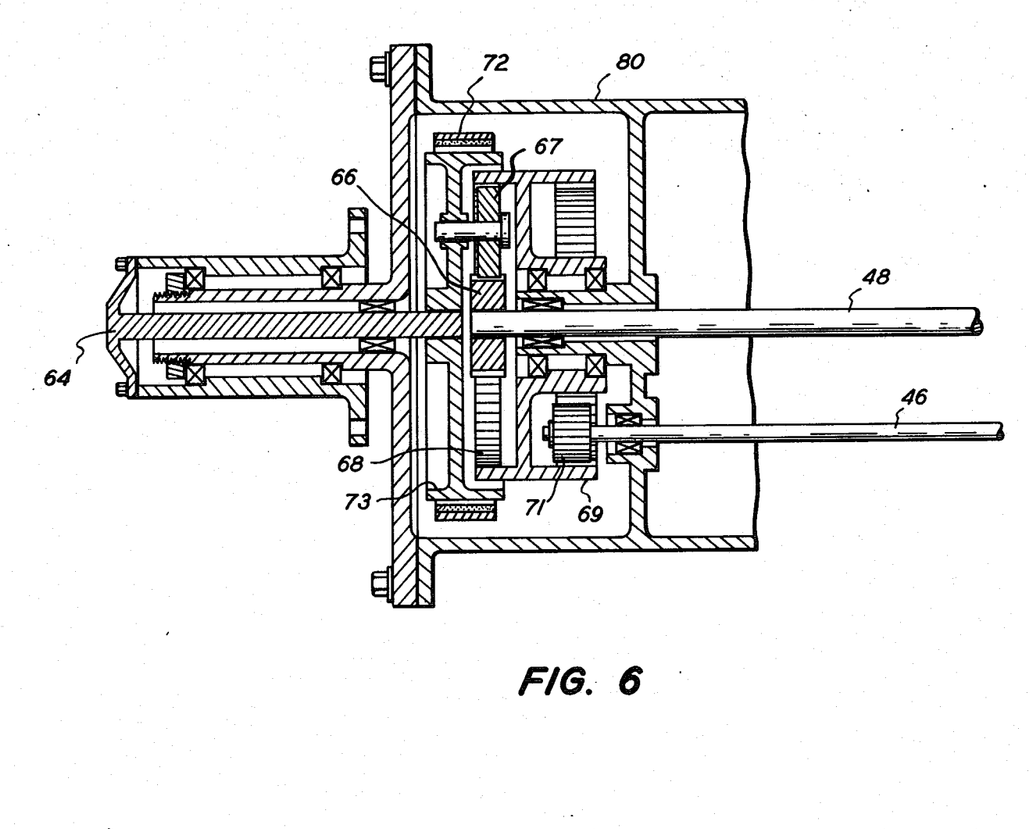
FIG. 6 is a partially schematic cross-sectional view of a planetary reduction gear system applying our invention to an unsprung vehicle.

A similar planetary reduction gear arrangement is shown in FIG. 6 for an unsprung vehicle having a main support housing 80 suitable for a track-laying vehicle. Again, driving torque is applied via shaft 48 to sun gear 66 and steering control torque is applied via shaft 46 to gear 71 meshed with a gear 69 that turns planetary ring gear 68. Planet gears 67, rotating at a reduced speed between sun gear 66 and ring gear 68, turn rotor 73 and shaft 64, which can mount a drive sprocket (not shown) for advancing an endless track. A brake 72 can brake rotor 73.

Figure 7:
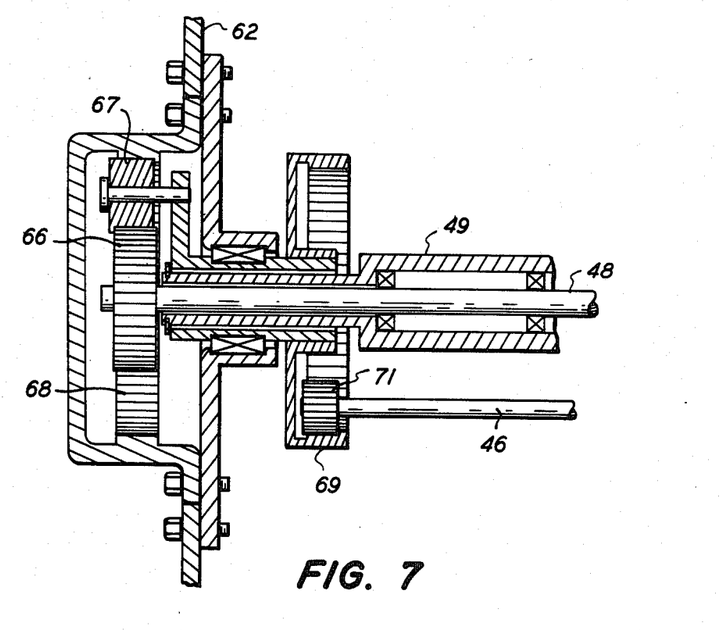
FIGS. 7 and 8 are schematic views of alternative drive arrangements for differential reduction gears systems.

As schematically suggested in FIG. 7, steering control torque via shaft 46, gear 71, and ring gear 69 can also be applied to planet gears 67 of a planetary reduction gear system receiving driving torque from shaft 48 to sun gear 66. This produces reduced rotation of planetary ring gear 68 which turns a drive element in the form of a sprocket or wheel 62. It is also possible to input driving torque to the planets or ring of a planetary reduction gear, while inputting steering control torque to an element not receiving driving torque, and have the remaining element combine the two torques differentially and apply the result to a wheel or sprocket.

Figure 8:
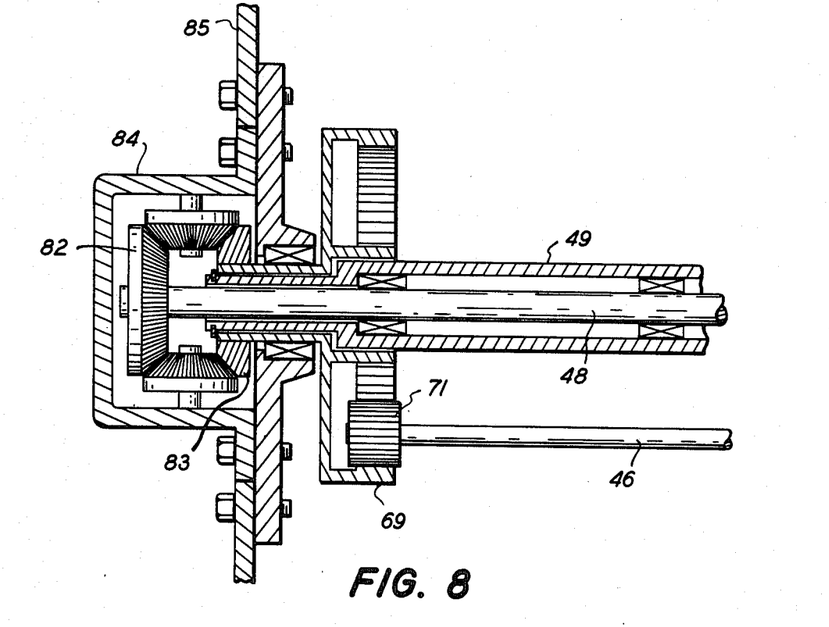

Bevel and spur gear differentials can also be used in reduction drive systems according to our invention, as schematically suggested in FIG. 8. Driving torque on shaft 48 can be input to side gear 82, and steering control torque on shaft 46 can be input via gear 71 and ring gear 69 to opposite side gear 83. Differential rotation of side gears 82 and 83 provides a reduced drive output at the differential hub casing 84 for turning a sprocket or wheel 85. Spur gear differentials can also be used in place of a bevel gear differential such as shown in FIG. 8, and the two drive and steering control torques can be input to different elements to cause differential and reduced rotation of an output.

PIVOT TURNING

Figure 9:
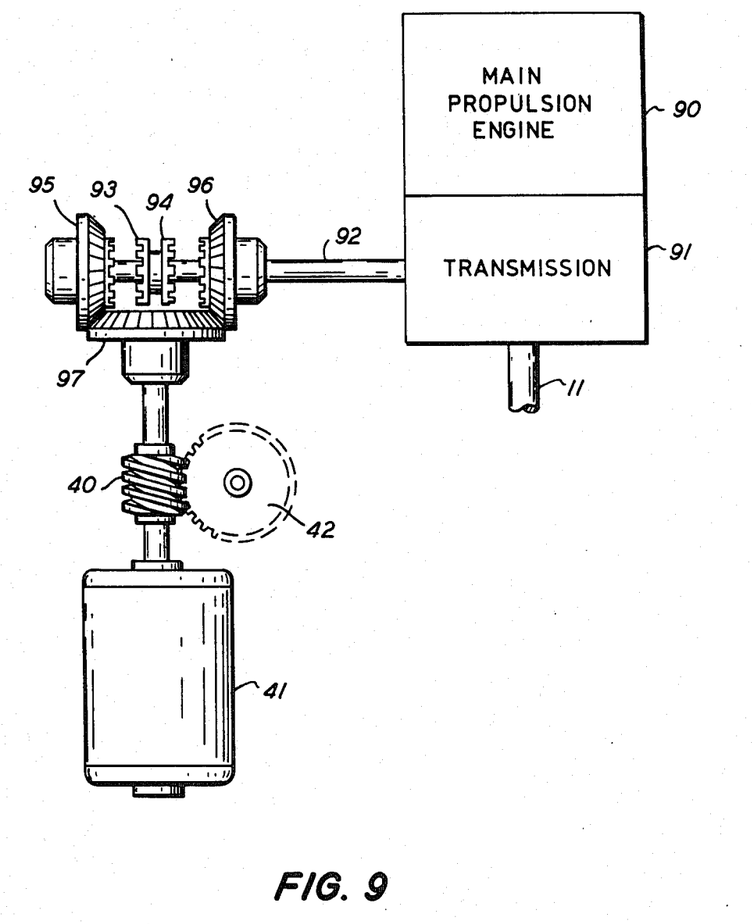
FIG. 9 is a schematic view of a clutch system for a power take-off applying torque to the steering control input for powering pivot turns.

Pivot turns can be power assisted or powered totally by driving torque to be executed more rapidly. Since a vehicle is not using driving torque for forward or rearward movement when pivot turning occurs, driving torque is available for powering pivot turns; and FIG. 9 schematically shows a preferred way of accomplishing this.

A power take-off 92 from a transmission 91 or main propulsion engine 90 rotates clutch parts 93 and 94. Either of these can be engaged, with its counterpart 95 and 96, each of which are meshed with bevel gear 97 rotating with worm gear 40. To apply driving torque to a pivot turn in one direction, clutch part 93 is meshed with clutch part 95 to turn bevel gear 97 in the desired direction for rotating worm gear 40 and worm wheel 42. Steering control motor 41 can be unclutched for engine powered pivot turns or can combine its torque with the torque provided via bevel gear 97. For applying propulsion torque to power a pivot turn in an opposite direction, clutch part 94 meshes with its counterpart 96, driving bevel gear 97 in an opposite direction and turning worm 40 and worm wheel 42 in an opposite direction.

A power take-off can be derived from many points along the main propulsion drive train, including engine 90, transmission 91, and other points. A power take-off can be made to turn continuously or be operated only when needed for pivot turns. The engagement of clutch parts 93 and 94 can be made responsive to full turn of a steering wheel, calling for a pivot turn; and any engagement of clutch parts 93 and 94 can be locked out during forward or rearward movement of the vehicle, if desired. Propulsion assisted pivot turning can also be applied to worm wheel 42 by a worm gear separate from steering control input worm gear 40, and different clutch arrangements can be used for engaging and disengaging the diversion of drive torque for pivot turning. Applying drive torque to the steering control input allows pivot turns to be accomplished more rapidly than would be possible with a small sized steering control motor 41, adequate for forward and rearward steering.

We claim:
1. A no-slip steer controlled reduction drive for a vehicle having a propulsion drive shaft providing same direction driving torque to planetary differential reduction gears arranged on opposite sides of said vehicle for respectively driving right and left traction elements, said drive shaft being connected to drive elements of said planetary differential reduction gears, said system comprising:
   a. a pair of steering control shafts rotated in opposite directions by a bevel gear drive, said steering control shafts extending directly from said bevel gear drive to differentiating elements of said planetary reduction gears;
   b. a worm and worm wheel reducer for transmitting steering control torque to said bevel gear drive without being turned by said bevel gear drive;
   c. means for generating said steering control torque rotationally independent of said driving torque and for applying said steering control torque to said worm; and
   d. a clutch system for diverting said driving torque from said propulsion drive shaft to said worm wheel to use said driving torque for pivot turning.

2. The system of claim 1 including a power take-off for transmitting said driving torque to said worm wheel.

3. In a no-slip steer drive for a vehicle having a pair of planetary differential reduction gears arranged on opposite sides of said vehicle for turning opposite drive elements, a transverse drive shaft transmitting driving torque to both of said planetary reduction gears, and a pair of counterrotating steering control shafts transmitting steering control torque, rotationally independent of said driving torque, to both of said differential reduction gears, the improvement comprising:
   a. said counterrotating steering control shafts extending from said reduction gears directly to a worm and worm wheel reduction input of said steering control torque to said counterrotating control shafts so that said counterrotating control shafts are rotationally controlled by torque on said worm and are unable to rotate said worm; and
   b. a power take-off for diverting said driving torque to said worm wheel for propulsion drive-assisted pivot turning.

4. The improvement of claim 3 including a clutch for selectively engaging said driving torque with said worm wheel.

5. The improvement of claim 3 wherein said worm and worm wheel reduction input includes a bevel gear driven by said worm wheel and meshed with bevel gears on said counterrotating control shafts.

6. A method of inputting steering control torque to a no-slip, steer drive system for a vehicle having a planetary differential reduction gear system on each side of said vehicle for turning said drive elements and having driving torque transmitted through drive shafting to turn drive elements of both of said reduction gear systems in the same direction, said method comprising:
   a. generating steering control torque rotationally independent of said driving torque;
   b. reducing said steering control torque with a worm and worm wheel input to counterrotating control shafts that cannot turn said worm;

c. transmitting the reduced steering control torque through said counterrotating shafts from said worm and worm wheel input directly to steering elements of both of said reduction gear systems; and
d. applying said driving torque to said worm wheel for pivot turning.

7. The method of claim 6 including turning a bevel gear drive with said worm wheel for counterrotating said control shafts.

8. The method of claim 6 including using a power take-off transmitting said driving torque to said worm wheel.

9. The method of claim 8 including clutching and unclutching said driving torque with said worm wheel.

* * * * *